Patented Aug. 15, 1939

2,169,717

UNITED STATES PATENT OFFICE 2,169,717

COATING COMPOUND

George H. Young, Pittsburgh, Pa., assignor to Stoner-Mudge, Inc., a corporation of Pennsylvania No Drawing. Application March 7, 1938, Serial No. 194,324

8 Claims. (Cl. 260—86)

This invention relates to a coating compound capable of forming protective coatings upon the surfaces of other bodies, and relates specifically to a coating compound consisting primarily of certain of those resinous polymeric vinyl compounds known commercially as Vinylite. These compounds, as is well known, are the polymers and co-polymers of various vinyl compounds, such polymers and co-polymers being of resinous nature. Amongst the resinous polymeric vinyl compounds there may be given as typical polyvinyl acetate, polyvinyl propionate, polyvinyl chloride, polyvinyl bromide, polyvinyl chloro-bromide, polyvinyl chloro-acetate, polyvinyl chloro-propionate, and polyvinyl chloro-alcohol. Generally stated, the resin-type substance with which I am concerned consists of any polymer, co-polymer, or polymeric mixture of the compound responding to the formula $CH_2=CH-X$, in which X may be a halogen, the hydroxyl group, acetoxyl, propionoxyl, or in general any mono-carboxylic acyloxyl group. In the ensuing claims the term polymer will be understood to be inclusive of polymers, co-polymers, and polymeric mixtures. And, specifically, I have found suited to my purpose those resinous products that result from the simultaneous polymerization of vinyl chloride and vinyl acetate.

The object of my invention is to add to such resinous polymeric vinyl compounds a substance which will serve to impart thermal stability to a film consisting primarily of the polymeric vinyl compounds. For example, a normal polymeric vinyl film deposited upon metal tends to decompose at relatively low temperatures if it is as heavy as is usual for films of this nature, exceeding in weight 7 milligrams per square inch. The specific decomposition temperatures vary somewhat with different metals to which the film is applied. For some of the most used metals the decomposition temperatures may be given as follows:

| | Degrees F. |
|---|---|
| Tin plate | 300 |
| Iron | 290 |
| Zinc | 280 |
| Copper | 330 |

It is, therefore, a matter of desirability, and specifically my object herein, so to increase the thermal stability of the polymeric vinyl film that, as applied to such metals, or to other metals and materials, it will endure temperatures substantially higher than those noted without undergoing decomposition.

I have found that, by adding to the resinous polymeric vinyl compound specifically named above a compound selected from the class known as the quinoline and isoquinoline alkaloid bases, and particularly from the cinchona alkaloid bases, an applied coating of the mixture possesses greatly increased thermal stability. The alkaloid bases so added may be used either in the form of their pure compounds or as mixed concentrates, extracts, or basic residues derived from the process of extraction of one or more of the pure compounds. The invention of this application is a species within the general field described and claimed in a co-pending application of Arthur W. Johnson and George H. Young (the present applicant) filed July 28, 1938, Serial No. 221,799.

The resinous polymeric vinyl compound that I preferably employ is the product of the simultaneous polymerization of vinyl chloride (85%) and vinyl acetate (15%). The polymerization may be accomplished with or without a catalyst, with or without the aid of actinic light. The ratio given is preferred; the ingredients may, however, be compounded in any and all proportions. The following may be regarded as an exemplary procedure. Taking 100 grams of a 20% solution of the product of polymerization (the solvent being, desirably, a mixture of the typical ketone solvents for the polymeric vinyl resins, together with a mixed aromatic thinner), 0.1 gram of quinine may be added. If the so modified solution be then spread on tin-plate, for example, and the article be baked for 15 minutes at a temperature of 380° F., it will be found that no decomposition of the applied film has occurred, and that a serviceable coating has been provided. Extended testing has revealed the fact that, by such modification, the thermal stability of the Vinylite film has been so far increased as to withstand a baking temperature approximately one hundred degrees higher than the limiting temperature for the unmodified material.

In place of quinine, another cinchona alkaloid base may be employed. I have employed with success isoquinine, hydroquinine, ethyl apoquinine, quinidine, cinchonine, cinchonidine, quinoidine, cinchona febrifuge, and crude apo-quinine bases. This exhausts the list of readily available cinchona alkaloids. I have found none that is not serviceable to achieve thermal stabilization, and my experimentation indicates that all of the cinchona alkaloids, pure and impure, single and mixed, are so serviceable.

The typical substance, quinine, may advantageously be added in the quantity indicated—

0.1 gram of quinine to 100 grams of a 20% solution of the vinyl compound. Even a smaller quantity will give in lesser measure the desired effect. Preferably, however, not less than 0.05 gram is used. The quantity may be increased to 0.2 gram. Beyond that, larger additions are wasteful, and have little increasing good effect. The other pure cinchona alkaloids named may advantageously be used in like quantity. The impure and mixed ones, however (quinoidine, cinchona febrifuge, and crude apoquinine bases) should be used in approximately double the quantity named for the pure substances. The addition of 0.05 gram of the alkaloid to 100 grams of the solution specified amounts to a 0.25% addition, by weight, to the amount of polymeric vinyl resin present in solution; and the addition of 0.2 gram amounts, correspondingly, to a 1% addition to the resin.

As an alternative to admixture of the stabilizing material to the polymeric vinyl resin in solution, it may in any of its forms be milled with the solid resin, and the milled mixture may then be made ready and applied, in like manner as the resin alone.

Increase in the thermal stability of a Vinylite film presents marked practical advantage, in that as so stabilized the film may be subjected to baking at increased temperatures, and as a result a marked improvement in adhesion to the surfaces being coated, and in resistance to moisture and other corrosive influences, is effected. Also, as applied to a metal, the metal coated with a Vinylite film of increased thermal stability is capable, as a material or article, of being subjected to temperatures of increased severity without destruction of the coating thereon.

A stabilizer for the substances here specified, consisting of a pitch containing a tar base, has been described. The stabilizer material of this invention possesses the advantages over tar-base stabilizers that it causes no discolorization and that, added in smaller quantities, it is equally efficacious.

I claim as my invention:

1. A thermally stabilized coating compound consisting of a polymer of a substance corresponding to the formula $CH_2=CHX$, in which X is a substance of a group consisting of the halogens, the hydroxyl group, and the monocarboxylic acyloxyl groups, and a cyclic nitrogen base nitrogen base selected from a group consisting of the quinoline and isoquinoline alkaloid bases.

2. A thermally stabilized coating compound consisting of a polymer of a substance responding to the formula $CH_2=CH-X$, in which X is a substance of a group consisting of the halogens, the hydroxyl group, and the monocarboxylic acyloxyl groups, and a cinchona alkaloid stabilizer.

3. A thermally stabilized coating compound consisting of a polymer of a substance responding to the formula $CH_2=CH-X$, in which X is a substance of a group consisting of the halogens, the hydroxyl group, and the monocarboxylic acyloxyl groups, and a cinchona alkaloid stabilizer in a quantity of substantially 0.25 to 1% of the first-named substance.

4. A thermally stabilized coating compound consisting of a polymer of a substance corresponding to the formula $CH_2=CHX$, in which X is a substance of a group consisting of the halogens, the hydroxyl group, and the monocarboxylic acyloxyl groups, and quinine in a quantity of substantially 0.25 to 1% of the first-named substance.

5. A thermally stabilized coating compound comprising the resinous product of the polymerization of vinyl chloride together with a cinchona alkaloid stabilizer.

6. A thermally stabilized coating compound comprising the resinous product of the polymerization of vinyl chloride together with quinine.

7. A thermally stabilized coating compound comprising the resinous product of the simultaneous polymerization of vinyl chloride and vinyl acetate, together with a cinchona alkaloid stabilizer.

8. A thermally stabilized coating compound comprising the resinous product of the simultaneous polymerization of vinyl chloride and vinyl acetate, together with quinine.

GEORGE H. YOUNG.